United States Patent
Yamada et al.

(10) Patent No.: US 6,370,316 B1
(45) Date of Patent: Apr. 9, 2002

(54) APPARATUS FOR RETRIEVING AND ADMINISTRATING MOVING PICTURES AND RELATED NETWORK SYSTEM

(75) Inventors: Shin Yamada; Akiyoshi Tanaka, both of Kawasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/522,904

(22) Filed: Mar. 10, 2000

(30) Foreign Application Priority Data

Jul. 13, 1999 (JP) .......................... 11-198406

(51) Int. Cl.[7] .......................... H04N 5/783; H04N 5/782
(52) U.S. Cl. .......................... 386/46; 386/55
(58) Field of Search .......................... 386/46, 52, 55, 386/57, 4, 1, 60, 62, 65, 69, 95, 68, 124; 360/13; H04N 5/783, 5/782

(56) References Cited

U.S. PATENT DOCUMENTS 5,568,275 A * 10/1996 Norton et al. ................ 386/52
5,696,869 A * 12/1997 Abecassis .................... 386/52

FOREIGN PATENT DOCUMENTS

JP          9-247602          9/1997

* cited by examiner

*Primary Examiner*—Robert Chevalier
(74) *Attorney, Agent, or Firm*—Israel Gopstein Clark & Brody

(57) ABSTRACT

Video data is segmented into a plurality of scenes. For each of the segmented scenes, an index is produced as an assembly of section information required in a playback of each scene, scene number, and representative frame of scene. A title is added to each index according to search purpose. In a retrieving operation, a desired index is easily found according to the title. The scenes of the retrieved index are successively played back in order of scene number.

15 Claims, 14 Drawing Sheets

FIG. 3

```
VIDEO FILE NAME : c:\video\file1.mpg
START      END        SCENE #   REPRESENTATIVE
TIME       TIME                 FRAME
00:00:00   00:00:10      1      d:\index1\file1_1.jpg
00:00:10   00:00:17      2      d:\index1\file1_2.jpg
00:00:17   00:00:30      3      d:\index1\file1_3.jpg
00:00:30   00:00:33      4      d:\index1\file1_4.jpg
```

FIG. 4

```
VIDEO FILE NAME : c:\video\file1.mpg
START      END        SCENE #   REPRESENTATIVE
TIME       TIME                 FRAME
00:00:00   00:00:10      1      d:\index2\file1_1.jpg
00:00:17   00:00:30      2      d:\index2\file1_3.jpg
00:00:30   00:00:33      3      d:\index1\file1_4.jpg
```

FIG. 5

```
INSTRUMENTS UTILIZING ∞'S LAW              d:\index11\file4_3.idx
    EXPERIMENT OF ∞                        d:\index10\file4_2.idx
HISTORICAL BACKGROUND OF ∞'S LAW           d:\index9\file4_1.idx
    RECOMMENDATION BY MR. ∞                d:\index8\file3_3.idx
  SPORTS EVENT RESULT xx/xx/99             d:\index7\file3_2.idx
     NEWS (ABSTRUCT) xx/xx/99              d:\index6\file3_1.idx
         AT xxxx HOTEL                     d:\index5\file2_2.idx
         AT ∞∞∞∞ COAST                     d:\index4\file2_1.idx
  HE/SHE BECAME SO BIG···1 YEAR-OLD        d:\index3\file1_3.idx
    1 YEAR-OLD BIRTHDAY (ABSTRACT)         d:\index2\file1_2.idx
  1 YEAR-OLD BIRTHDAY (AUTO-PRODUCED)      d:\index1\file1_1.idx
```

APPARATUS FOR RETRIEVING AND ADMINISTRATING MOVING PICTURES AND RELATED NETWORK SYSTEM

BACKGROUND OF THE INVENTION

The present invention relates to a moving picture retrieving and administrating apparatus and a related network system, enabling the users to perform the playback of moving pictures (or videos, or dynamic images) according to various search purposes and also facilitating the retrieving operation in finding out a desired moving picture from video data or database.

Various storing media, such as video tapes, magnetic disks, optical disks, video CDs, DVDs, and hard disks, are conventionally used to store picture images. The picture images stored in these storing media can be played back by using a moving picture playback apparatus or a personal computer.

For example, the Unexamined Japanese Patent publication No. 9-247602 discloses a moving picture retrieving apparatus which allows each user to select his/her favorite title in retrieving the video data and displays a plurality of screens corresponding to the selected title in response to a user's selection of the title.

FIG. 15 is a block diagram showing the arrangement of a conventional moving picture retrieving system. A data storing section 1501, corresponding to the above hard disk, stores genre selecting screen information 1511, video title selecting screen information 1512, and various video files 1513 in advance. A playback section 1502, functionally equivalent to a conventional playback board, decodes and plays a video file consisting of compressed moving pictures read from the data storing section 1501. The playback section 1502 sends the decoded video data to a display data buffer 1507.

A control section 1503, constituted by a CPU or a comparable device, is functionally equivalent to the personal computer storing the software. A screen display section 1504 displays the genre selecting screen information 1511, the video title selecting screen information 1512, and the various video files 1513 stored in the data storing section 1501, as well as various control buttons. An operator's input section 1505 is functionally equivalent to the pointing device, such as a keyboard, a mouse or the like.

A retrieval processing section 1506 is responsive to a video retrieving command entered by a user through the operator's input section 1505, and fetches a designated video image file among the various video files 1513 stored in the data storing section 1501 to search a video scene according to the later described time search or scene search method. The retrieval processing section 1506 sends the retrieved video screen information to a playback section 1502, and sends the information relevant to the retrieved video screen, such as time code, to the display data buffer 1507. The display data buffer 1507 temporarily stores the data displayed on a screen of the screen display section 1504.

FIG. 16 is a flowchart showing the operation of the conventional moving picture retrieving apparatus of FIG. 15.

The data storing section 1501 stores the video data which are compression coded and classified into a plurality of genres according to their contents (step 1601). Upon starting of an application software of this system activated by the user, the control section 1503 causes the data storing section 1501 to send the genre selecting screen information 1511 to the display data buffer 1507. As a result, the screen display section 1504 displays a genre selecting screen (step 1602). Then, the user selects one of the displayed genre names on the genre selecting screen by using the pointing device (step 1603).

Then, the video title selecting screen information 1512 is read out from the data storing section 1501. FIG. 17 shows a video title selecting screen displayed by the screen display section 1504. The video title selecting screen of FIG. 17 includes a plurality of representative screen images each corresponding to a head screen image of video data. Reference numeral 1701 represents a video title, and reference numeral 1702 represents the total time of each video data (step 1604).

The user selects one of the displayed video titles on the video title selecting screen by using the pointing device (step 1605).

In response to the user's input, the retrieval processing section 1506 starts the retrieving operation. More specifically, the retrieving screen is displayed. The buttons for allowing the user to selectively designate the time search and the scene search are also displayed (step 1606). The user selects either the time search or the scene search. The retrieval processing section 1506 performs the search selected by the user. FIG. 18 shows the search result displayed on the screen of the screen display section 1504. (step 1607). In FIG. 18, reference numeral 1801 represents the time code.

According to the time search, the video data is retrieved at designated time intervals and the retrieved screen image and its time code are displayed for each designated time interval.

According to the scene search, a scene change point (i.e., a cut point) is detected and a representative screen image and its time code are displayed for each detected scene. Preferably, the representative screen image is a head screen image of each scene. For example, the Unexamined Japanese Patent Publication No. 10-294923 discloses a technique relating to the scene change detecting method.

When the user operates the pointing device to designate the retrieved screen image or time code to select the playback (YES in step 1608), the video file selected in the step 1605 is transmitted from the data storing section 1501 to the playback section 1502. The playback section 1502 decodes the video data of the designated video file which are stored in a compressed condition. Moving pictures starting from the retrieved screen (i.e., representative frame of screen) selected in the step 1608 are stored in the display data buffer 1507. Then, the playback operation is performed to display the moving pictures stored in the display data buffer 1507 (step 1609).

It is then checked weather the user wants to continue the playback operation, i.e., whether the user desires to additionally play the video data of another video title (step 1610). When the continuation of the playback operation is required (YES in FIG. 1610), the above-described processing starting from step 1602 is repeated. Otherwise, the retrieval processing is terminated.

According to the above-described moving picture retrieving system, a plurality of representative screen images of video data corresponding to the video title selected by the user are automatically displayed and then the video data starting from the user's selected screen image is played. However, the user does not always want to watch the continuous or consecutive scenes which are serial on time base. If the user wants to play only his/her favorite scenes, it is necessary to pick up each of such scenes which are usually positioned at different portions of the video data. Performing the retrieving operation repetitively for detecting the head screen image of each scene is time-consuming and troublesome. It may be possible to construct new video data by connecting only the necessary scenes selected from the video data. In this case, a large capacity video data storage will be required.

Furthermore, the above-described conventional retrieving system requires the user to designate his/her favorite scene by selecting one of the displayed representative screen images without confirming the movement of a displayed objective or without knowing the contents of accompanying voice or sound. Thus, the user is usually forced to partly play some candidate scenes to check whether or not each candidate scene is the user's really requested scene.

If the user can easily remember the story or detailed contents of the video data by simply checking each representative screen image, the above-described conventional retrieving system will work properly. However, a long time may elapse since the last search of the video data has been done. In such a case, it is difficult for the user to clearly remember the story or detailed contents of the video data by simply checking each representative screen image. Thus, the user is forced to partly play some candidate scenes to identify the user's really requesting scene.

Similarly, in a case where the user performs the retrieving operation on the video data arranged or edited by someone else, the retrieving operation becomes time-consuming and troublesome.

SUMMARY OF THE INVENTION

An object of the present invention is to provide a moving picture administrating apparatus capable of easily realizing an effective playback operation which plays only necessary portions of the video data.

Another object of the present invention is to provide a moving picture administrating apparatus capable of improving the efficiency in the repetitive search operations for similar purposes, such as playback of a same video tape.

In order to accomplish this and other related objects, the present invention provides a first moving picture administrating apparatus, according to which an index producing means is provided for segmenting video data into a plurality of scenes, and producing at least one index being edited as an assembly of section information required in a playback of each scene, scene number, and representative frame, and then adding a title to each index according to search purpose. A data storing means is provided for storing the video data, the index, and the title. And, a retrieving means is provided for retrieving a desired index according to the title and successively playing scenes of the retrieved index in order of scene number.

Moreover, the present invention provides a moving picture administrating system, according to which an index producing client is provided for segmenting video data into a plurality of scenes, and producing at least one index being edited as an assembly of section information required in a playback of each scene, scene number, and representative frame, and then adding a title to each index according to search purpose. A server is provided for storing the video data, the index, and the title. At least one retrieving client is provided for retrieving a desired index according to the title and successively playing scenes of the retrieved index in order of scene number. And, a network is provided for connecting the server, the index producing client, and the retrieving client.

Moreover, the present invention provides a second moving picture administrating apparatus, according to which a video data storing means is provided for storing video data. A scene producing means is provided for segmenting the video data stored in the video data storing means into a plurality of scenes, giving a scene number to each of the segmented scenes, and selecting a representative frame. An index storing means is provided for storing at least one index being edited as an assembly of section information required in a playback of each scene, the scene number, and the representative frame which are produced by the scene producing means. An index editing means is provided for editing the index stored in the index storing means to produce a new index. A title adding means is provided for adding a title to each index stored in the index storing means. And, a playback means is provided for successively playing scenes in order of the scene number so that the playback starts with one of scenes of the index.

Preferably, in the second moving picture administrating apparatus, the index storing means comprises at least one file for storing indices, and a database means is provided for administrating and retrieving file names of the indices and the titles added to respective indices.

Preferably, the second moving picture administrating apparatus further comprises a keyword adding means for giving keywords to the indices stored in the index storing means. In this case, the index storing means comprises at least one file for storing the indices, and a database means is provided for administrating and retrieving file names of the indices and the keywords added to the indices.

Preferably, the second moving picture administrating apparatus further comprises a title display means for displaying the titles of the indices stored in the index storing means. In this case, the titles displayed by the title display means satisfy given retrieval conditions.

Preferably, in the second moving picture administrating apparatus, the editing performed by the index editing means includes at least one operation selected from the group consisting of the change of scene number, division of scene, joint of scenes, deletion of scene, and change of the representative frame.

Preferably, the second moving picture administrating apparatus further comprises a title selecting means for selecting one of titles given by the title adding means, and an index display means for displaying representative frames which are selected beforehand as corresponding to the index having the title selected by the title selecting means.

Preferably, the second moving picture administrating apparatus further comprises a character string display means for collecting character strings to be displayed on a screen by retrieving the video data stored in the video data storing means and for displaying a list of obtained character strings.

Preferably, the second moving picture administrating apparatus further comprises a caption frame detecting means for retrieving the video data stored in the video data storing means to detect a caption frame containing a character string, a character recognizing means for recognizing a character string contained in each caption frame, and a character string display means for displaying a list of character strings recognized by the character recognizing means.

Moreover, the present invention provides a third moving picture administrating apparatus, according to which a video data storing means is provided for storing video data. A scene producing means is provided for segmenting the video data stored in the video data storing means into a plurality of scenes, giving a scene number to each of the segmented scenes, and selecting a representative frame of scene. An index storing means is provided for storing at least one index being edited as an assembly of section information required in a playback of each scene, the scene number, and the representative frame which are produced by the scene producing means. An index editing means is provided for editing the index stored in the index storing means to produce a new index. A marker means is provided for selecting one of scene numbers of the indices stored in the index storing means and for adding a title to the selected scene number. And, a playback means is provided for successively playing scenes of the index in order of the scene number so that the playback starts with the scene number of the index corresponding to the title given by the marker means.

BRIEF DESCRIPTION OF THE DRAWINGS

The above and other objects, features and advantages of the present invention will become more apparent from the following detailed description which is to be read in conjunction with the accompanying drawings, in which:

FIG. 3 is a schematic view showing an example of an index file automatically produced by the moving picture administrating apparatus in accordance with the first embodiment of the present invention;

FIG. 4 is a schematic view showing an example of an index file edited by the moving picture administrating apparatus in accordance with the first embodiment of the present invention;

FIG. 5 is a schematic view showing an example of a title file produced by the moving picture administrating apparatus in accordance with the first embodiment of the present invention;

DESCRIPTION OF THE PREFERRED EMBODIMENTS

Figure 1:
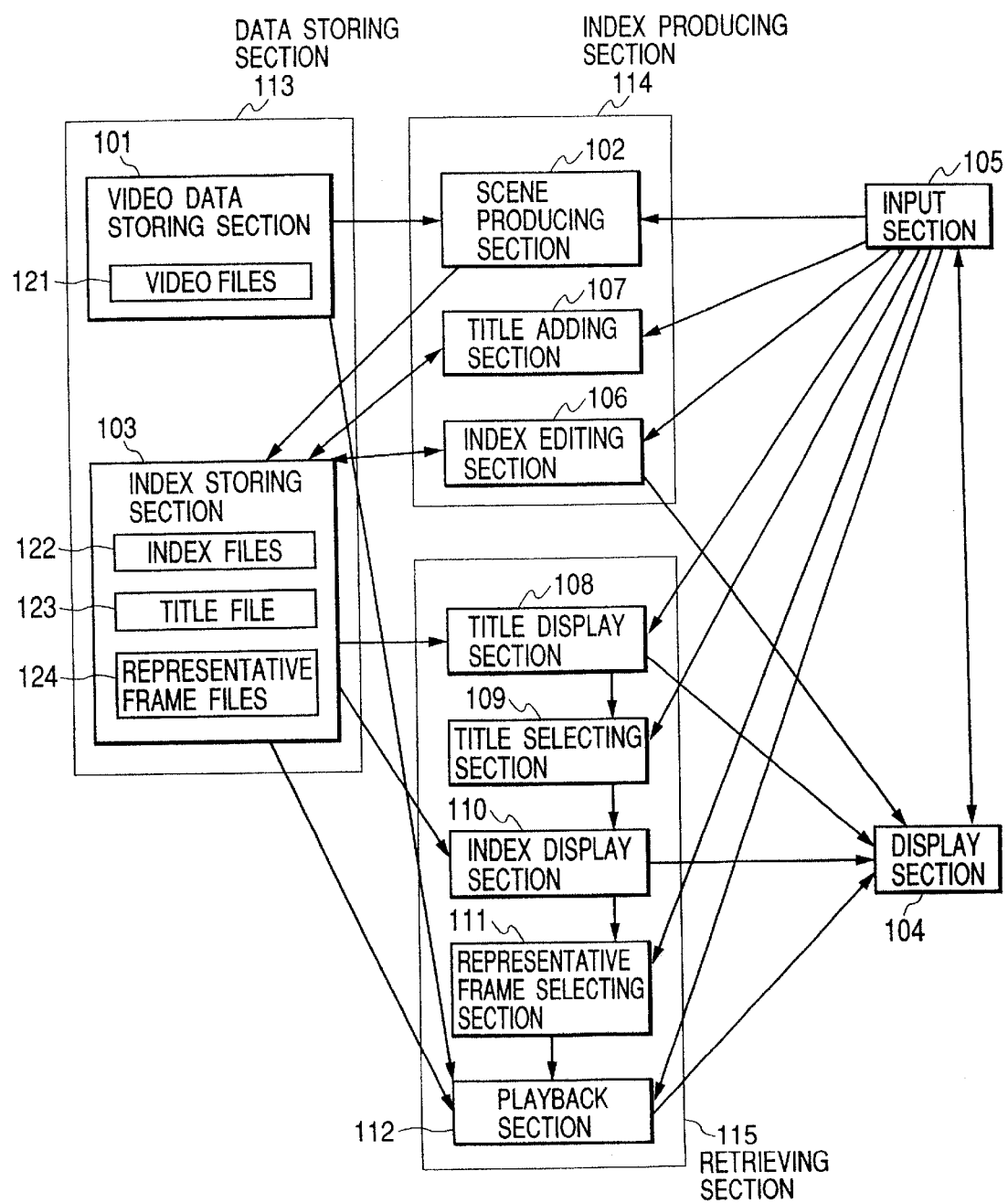
FIG. 1 is a block diagram showing the arrangement of a moving picture administrating apparatus in accordance with a first embodiment of the present invention.

Hereinafter, preferred embodiments of the present invention will be explained with reference to FIGS. 1 to 14. Identical parts are denoted by the same reference numerals throughout the views.

First Embodiment

FIG. 1 is a block diagram showing the arrangement of a moving picture administrating apparatus in accordance with a first embodiment of the present invention. A video data storing section 101 stores video files 121 (i.e., files consisting of video data). For example, the video data are compression coded according to the established international standard for the moving picture coding, such as MPEG1 (ISO/IEC 11172) or MPEG2 (ISO/IEC 13818). A scene producing section 102 receives the video data from the video data storing section 101 and segments the received video data into a plurality of scenes. Then, the scene producing section 102 allocates a scene number to each of the segmented scenes, and produces a representative frame by picking up a representative screen image from each scene.

An index storing section 103 stores index files 122, a title file 123, and representative frame files 124. Each index file 122 is an assembly of section information required in the playback operation as well as the scene number and the representative frame of each scene. The title file 123 stores titles given to respective indices. For example, start time and end time of each scene are the section information required for the playback of each scene. One representative frame file 124 stores representative frames of scene. The related titles are summarized as a single file.

A display section 104 displays the representative frames, index titles, and moving images. An input section 105 allows the user to designate edition of indices, input titles, select titles, and select a representative frame.

An index editing section 106 reads one of the indices stored in the index storing section 103, and causes the display section 104 to display the representative frames in accordance with their scene numbers. Furthermore, the index editing section 106 edits the index in response to the user's instruction, and produces a new index. The user's instruction includes the change of scene number, division of scene, joint of scenes, deletion of scene, and change of the representative frame of scene.

A title adding section 107 gives a title to each index. A title display section 108 causes the display section 104 to display the titles of respective indices stored in the index storing section 103. A title selecting section 109 selects one of the titles displayed on the display section 104 in response to a user's instruction. An index display section 110 causes the display section 104 to display the representative frame of the designated index corresponding to the title selected by the title selecting section 109. A representative frame selecting section 111 selects one of the representative frames displayed on the display section 104 in response to a user's instruction. A playback section 112 plays the scenes of the designated index in the order of scene number. The playback operation starts with the head frame (i.e., representative frame) selected by the scene frame selecting section 111.

A data storing section 113 consists of the video data storing section 101 and the index storing section 103. An index producing section 114 consists of the scene producing section 102, the title adding section 107, and the index editing section 106. A retrieving section 115 consists of the title display section 108, the title selecting section 109, the index display section 110, the representative frame selecting section 111, and the playback section 112.

The video data storing section 101 and the index storing section 103 are practically realized by conventionally available recording/storing devices including hard disks, DVD-ROMs, and PDs. The scene producing section 102, the index editing section 106, the title adding section 107, the title display section 108, the title selecting section 109, the index display section 110, the representative frame selecting section 111, and the playback section 112 are practically realized by a CPU installed in a personal computer. The display section 104 is practically realized by a monitor or a comparable display device. The input section 105 is practically realized by an appropriate pointing device, such as a keyboard or a mouse.

Figure 2:
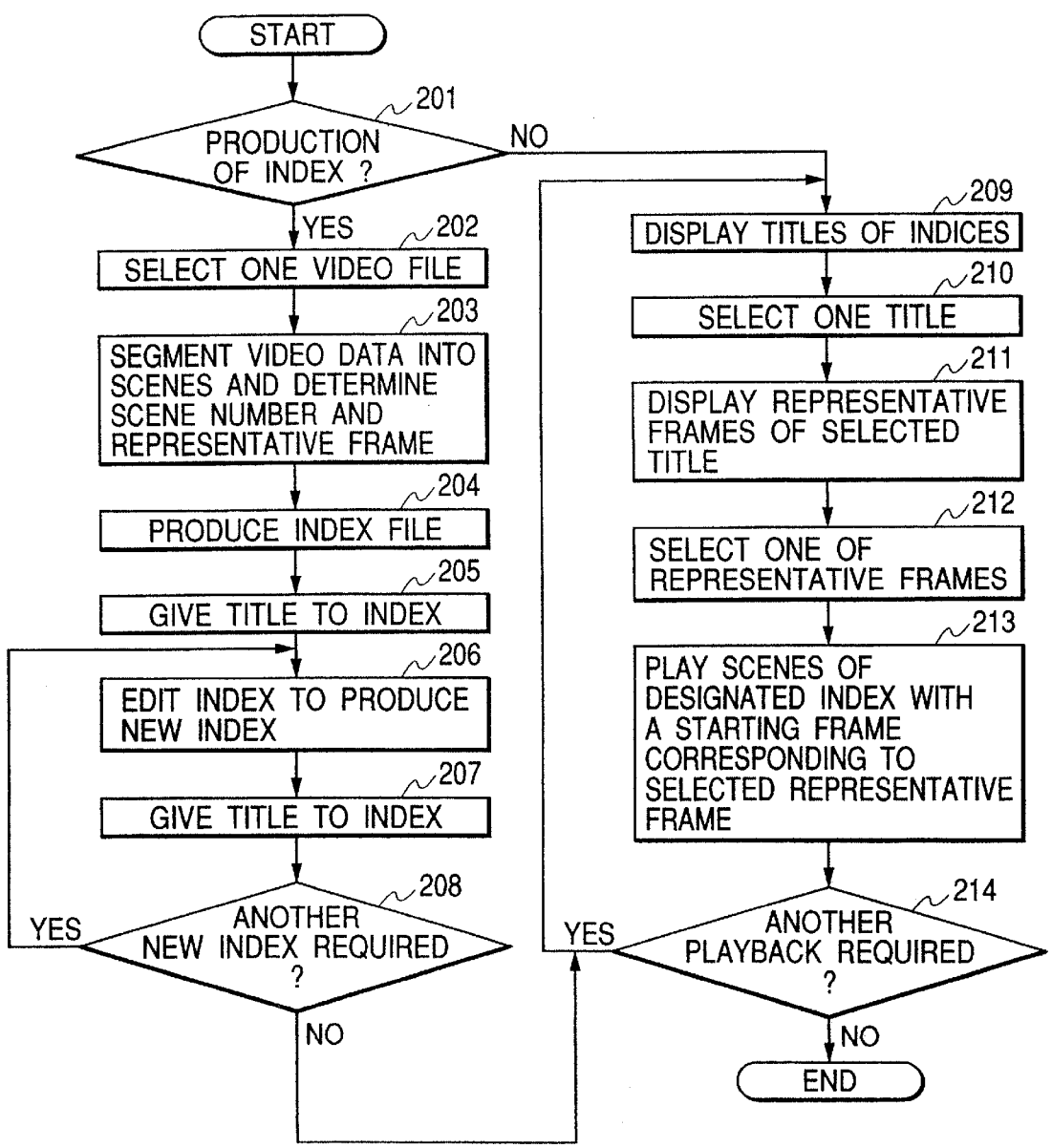
FIG. 2 is a flowchart showing the operation of the moving picture administrating apparatus in accordance with the first embodiment of the present invention.

FIG. 2 is the flowchart showing the operation of the above-described moving picture administrating apparatus in accordance with the first embodiment.

In step 201, it is checked whether the user intends to produce an index. The control flow proceeds to step 202 if the user wants to produce a new index (i.e. YES in step 201), and proceeds to step 209 otherwise, i.e., when the user performs the retrieving operation by using the presently available indices.

In step 202, one of the video files 121 stored in the video data storing section 101 is selected.

In step 203, the scene producing section 102 segments the video data of the selected video file into a plurality of scenes, and allocates a scene number to each of the segmented scenes. Allocation of the scene numbers is serial in accordance with the arrayed order of scenes so that the first scene number is allocated to the head scene. Regarding the method for segmenting the video data into a plurality of scenes, it is possible to detect every scene change according to the technique disclosed in the unexamined Japanese Patent Publication No. 10-294923. Each scene is defined by two adjacent scene changes. Both the start time and the end time of each scene resulting from such a scene segmenting operation are stored and later used in the playback operation, i.e., in the playback of the scenes of video files, performed by the playback section 112. The scene number "n" (n=an integer not smaller than 1) is allocated to the $n^{th}$ scene. The representative frame can be stored as a "JPEG (i.e., Joint Photographic Experts Group)" file which has a file format displayable on the WWW browser.

In step 204, the scene producing section 102 produces a file summarizing the obtained data, i.e., start/end times of each scene, scene number, file name of a representative frame of scene, and video file name of each scene. The scene producing section 102 sends this file (i.e., index file 122) to the index storing section 103. Thus, the index storing section 103 stores the index file 122 containing the produced index thus produced. FIG. 3 shows an example of the index file produced by the moving picture administrating apparatus of the first embodiment, according to which the first scene ranges from the head to 10 seconds, the second scene ranges from 10 to 17 seconds, the third scene ranges from 17 to 30 seconds, and the fourth scene ranges from 30 to 33 seconds.

In step 205, the user operates the input section 105 to enter his/her favorite title to be given to the new index produced in the step 204. The title adding section 107 reads the title file 123 which records all of the titles produced by the index storing section 103, and adds the newly produced title and its index file name to the head of this title file 123. Naming of the title is arbitrarily done according to the user's preference without any restrictions. For example, when the index is automatically produced based on the video data, it will be preferable to use the name clearly showing the nature of production process, such as "1 year-old Birthday (auto-produced)." The number of title file 123 is not limited to only one. It is preferable to produce a plurality of title files when the video data storing section 101 stores various kinds of video files 121 which can be classified into several genres, such as news programs, TV dramas, self-produced videotape recording data, etc. In such a case, it is preferable to provide an independent title file to each genre. It is also preferable to produce a new title file when the total number of the recorded titles exceeds a predetermined number (e.g. 100).

In step 206, the user operates the input section 105 to select one of index files 122 stored in the index storing section 103. The index editing section 106 reads the selected index file in response to the user's input, and causes the display section 104 to display representative frames in the order of scene number. Then, the index editing section 106 edits the index in accordance with the user's instructions and produces a new index.

The user's instructions entered through the input section 105 include the change of scene number, the division of scene, the joint of scenes, the deletion of scene, and the change of the representative frame.

For example, the index editing section 106 can change the scene number in the following manner.

When the $n^{th}$ scene is shifted to the next of the $m^{th}$ scene (m=an integer not smaller than n+1), new scene numbers for the original $(n+1)^{th}$ to $m^{th}$ scenes are allocated by subtracting 1 from the current scene numbers. As a result of the above shifting or shuffle of scenes, the original $n^{th}$ scene is newly allocated to the $m^{th}$ scene.

For example, the index editing section 106 can divide one scene into a plurality of scenes in the following manner.

When the $n^{th}$ scene ranging from time t1 to time t3 is divided into two scenes at an intermediate time t2, new scene numbers for the original scenes n+1, n+2, . . . are allocated by adding 1 to the current scene numbers. The first half of the divided scene, ranging from time t1 to t2, remains unchanged in its scene number. The second half of the divided scene, ranging from time t2 to t3, is newly allocated to the scene number (n+1).

For example, the index editing section 106 can join a plurality of scenes into one scene in the following manner.

When the $n^{th}$ scene starting from time t1 and the $(n+1)^{th}$ scene ending at time t2 are joined, new scene numbers for the original scenes n+2, n+3, . . . are allocated by subtracting 1 from the current scene numbers. The joined scene, ranging from time t1 to t2, is newly allocated to the scene number n.

For example, the index editing section 106 can delete an appropriate scene in the following manner.

When the $n^{th}$ scene is deleted, new scene numbers for the original scenes n+1, n+2, . . . are allocated by subtracting 1 from the current scene numbers.

For example, the index editing section 106 can change the representative frame in the following manner.

When the representative frame of the scene ranging from time t1 to time t2 is changed, an appropriate frame existing somewhere between time t1 to t2 can be selected as a new representative frame. FIG. 4 shows an example of the index file edited by the moving picture administrating apparatus of the first embodiment, according to which an original part ranging from 10 to 17 seconds is deleted. As a result, the first scene ranges from the head to 10 seconds, the second scene ranges from 17 to 30 seconds, and the third scene ranges from 30 to 33 seconds.

In step 207, the user operates the input section 105 to enter a name of the index file into which the produced index is stored as well as a title to be given to the produced index. The index storing section 103 stores the file of the index produced in the step 206. The title adding section 107 reads the title file 123 from the index storing section 103, and adds the title and the index file name entered by the user to the head of the title file 123.

By executing the steps 206 and 207, it becomes possible to produce a plurality of and various indices from the same video data and also becomes possible to give a title to each produced index. For example, it is possible to edit a new index titled "1 year-old Birthday (abstract)" which collects only important scenes from an original index titled "1 year-old Birthday (auto-produced)." Furthermore, it is possible to select a new title not directly relevant to the original title, such as "He/she Became So Big—1 year-old", when the user intends to show the edited index to others.

Furthermore, when the user and his/her family have their memories recorded by a same or common video camera during a travel, it is possible to integrate their memories into same video data with a plurality of indices. For example, each index may correspond to a recoding place. In this case, appropriate titles representing different recording places, such as "At ○○○○ Coast" or "At xxxx Hotel", can be given to respective indices. In this manner, when the video data can be classified into a plurality of groups, it is possible to produce a plurality of indices according to the classification.

Moreover, when the user produces a teaching material from a TV program or his/her self-produced video data, it is possible to produce an index beforehand by collecting only necessary scenes. FIG. 5 shows an example of the title file 123 storing a plurality of index titles together with their index file names.

In step 208, it is checked whether the user wants to continue the production of new index. When the user requests the production of another new index (i.e., YES in step 208), the control flow returns to the step 206. Otherwise, the control flow proceeds to step 209.

The index required in the retrieving operation is thus produced through the above-described steps 202 to 208. The retrieving operation using the produced indices is performed according to the following steps.

Figure 6:
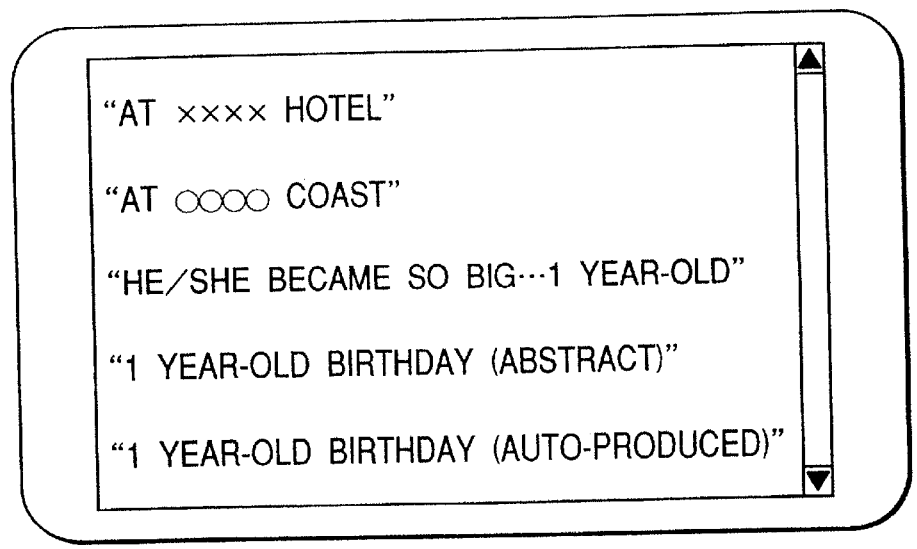
FIG. 6 is a schematic view showing a display example of titles in accordance with the first embodiment of the present invention.
Figure 7:
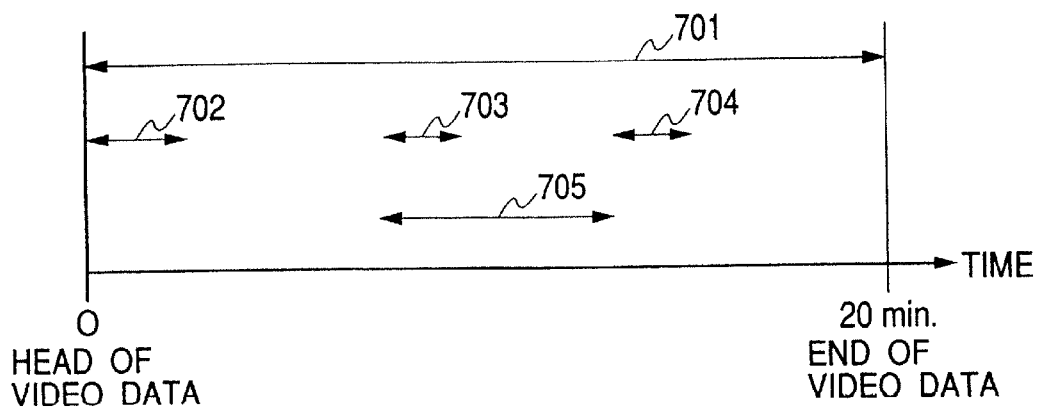
FIG. 7 is a schematic view showing different scenes played according to the index.

In step 209, the title display section 108 reads the title file 123 from the index storing section 103, and causes the display section 104 to display the readout index titles. It is possible to display a limited number of titles which are recorded in a specific title file designated by the user. FIG. 6 shows a display example of titles.

In step 210, the title selecting section 109 selects one of the titles displayed by the display section 104 in accordance with a user's instruction. In step 211, the index display section 110 causes the display section 104 to display a list of representative frames of the index corresponding to the title selected in the step 210. In step 212, the representative frame selecting section 111 selects one of the representative frames displayed in the step 211 in accordance with a user's instruction entered through the input section 105.

In step 213, the playback section 112 successively plays the consecutive scenes of the designated index in order of the scene number, so that the playback starts with the representative frame selected in the step 212. In step 214, it is checked whether the user wants to continue the playback operation (i.e., whether the user wants to play the scenes of other index). When the user requests the playback of any other index (i.e., YES in step 214), the control flow returns to the step 209. Otherwise, the retrieving operation is terminated.

According to the above steps 211 to 213, the playback operation starts from the representative frame selected by the user. However, it is possible to omit the step of selecting the representative frame of scene. In this case, after one preferable title is selected in the step 210, it is preferable to successively play all of the scenes from the head of the index corresponding to the selected title according to the scene number, instead of performing the above-described steps 211 and 213.

For example, the user may select the index titled "1 year-old Birthday (auto-produced)" which is automatically produced based on a 20-minute video data. In this case, all the scenes of the 20-minute video data are played from its beginning, as shown by a section 701 in FIG. 7. When the user selects the index titled "1 year-old Birthday (abstract)" which is an abstract collecting the important scenes, only the selected important portions are played back as shown by sections 702 to 704 in FIG. 7. When the user selects the index titled "He/she Became So Big—1 year-old", only a limited part corresponding to this title is played back as shown by a section 705 in FIG. 7.

The index editing operation may further include other operations, such as copy of scene, in addition to the above-described change of scene number, division of scene, joint of scenes, deletion of scene, and change of the representative frame of scene. It is also possible to renumber the scene numbers from the left to the right by arraying the necessary scenes in a horizontal direction. The same modification can be applied to each of the division of scene, the joint of scenes, the deletion of scene, and the change of the representative frame of scene.

Furthermore, it is possible to display a predetermined number of representative frames selected beforehand by the user in the step 211, instead of displaying the list of the representative frames of the index.

Figure 8:
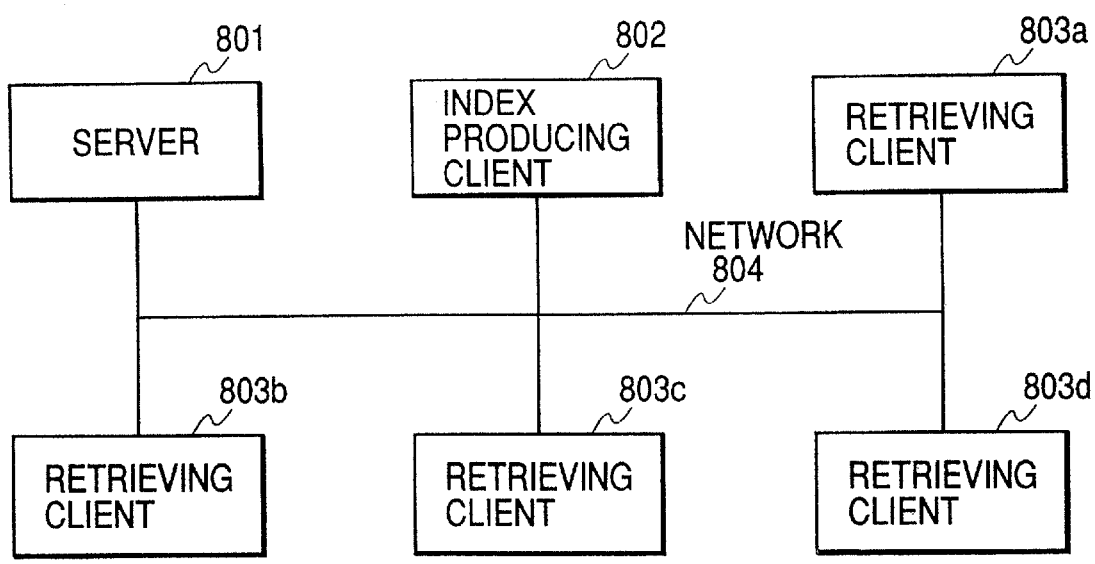
FIG. 8 is a block diagram showing a server/client type moving picture retrieving system in accordance with the present invention.

FIG. 8 shows a server/client type moving picture retrieving system incorporating the present invention. A server 801 stores video data, indices, and index titles. At least one index producing client 802 produces and edits the indices. A plurality of retrieving clients 803a to 803d allow unlimited users to perform the retrieving operation. A network 804, such as Ethernet, connects the server 801, the index producing client 802 and the retrieving clients 803a to 803d. The server 801 is functionally equivalent to the video data storing section 101 and the index storing section 103. The index producing client 802 is functionally equivalent to the scene producing section 102, the index editing section 106, and the title adding section 107. The retrieving clients 803a to 803d are functionally equivalent to the title display section 108, the title selecting section 109, the index display section 110, the representative frame selecting section 111, and the playback section 112.

For example, the server 801 stores the videos of news programs. When these videos are searched on the client's WWW (World Wide Web) browser, it is possible to select an index titled "xx/xx/99 News (abstract) " to watch the essential portions of the news of this day. It is also possible to select an index titled "Sports Event Result" to selectively watch the news of a specific theme. It is also preferable to select an index titled "Recommendation by Mr. ○○" to watch the news selected by his/her hobby friend.

As the section information necessary to play the scenes, it is possible to use the information other than the start/end times of each scene. For example, the section information may include the start/end frame numbers of each scene, or the byte number defining a duration or interval from the head of the video file to the scene head or to the scene end.

According to the above-described first embodiment, it becomes possible to perform the playback operation by connecting only necessary scenes of video data by editing the indices arraying the necessary scenes. Thus, the first embodiment makes it possible to simply play the abstract or the like from the given video data. The data size of the index produced for playing only the necessary portions is smaller than that of the video data produced by connecting the necessary scenes. Thus, it is not necessary to expand the capacity of the video data storing section so much.

Furthermore, the above-described first embodiment makes it possible to produce a plurality of and various indices from the same video data. An appropriate title is given to each index thus produced. Hence, it becomes possible to reuse the old search result collected according to the retrieval purposes arbitrarily selected by the user. Furthermore, a plurality of indices can be produced from one video data according to the contents. It becomes possible to simply administrate numerous and various kinds of video data by using the indices. The user can retrieve the indices according to the titles given to respective indices.

When one computer acting as the server 801 and numerous personal computers acting as clients are connected by the Internet or Intranet so as to constitute the server/client type moving retrieving system, the above-described first embodiment makes it possible to allow numerous unlimited users to perform effective search of their favorable news and images.

When only the pre-selected representative frames are displayed in response to the user's selection from the index titles in the retrieval operation, it becomes possible to reduce the total number of displayed scenes compared from the case where all of representative frames are displayed at a time. In other words, the above-described first embodiment makes it possible to substantially reduce the user's burden in confirming the contents of the indices or in retrieving the scenes played by the playback section.

Second Embodiment

Figure 9:
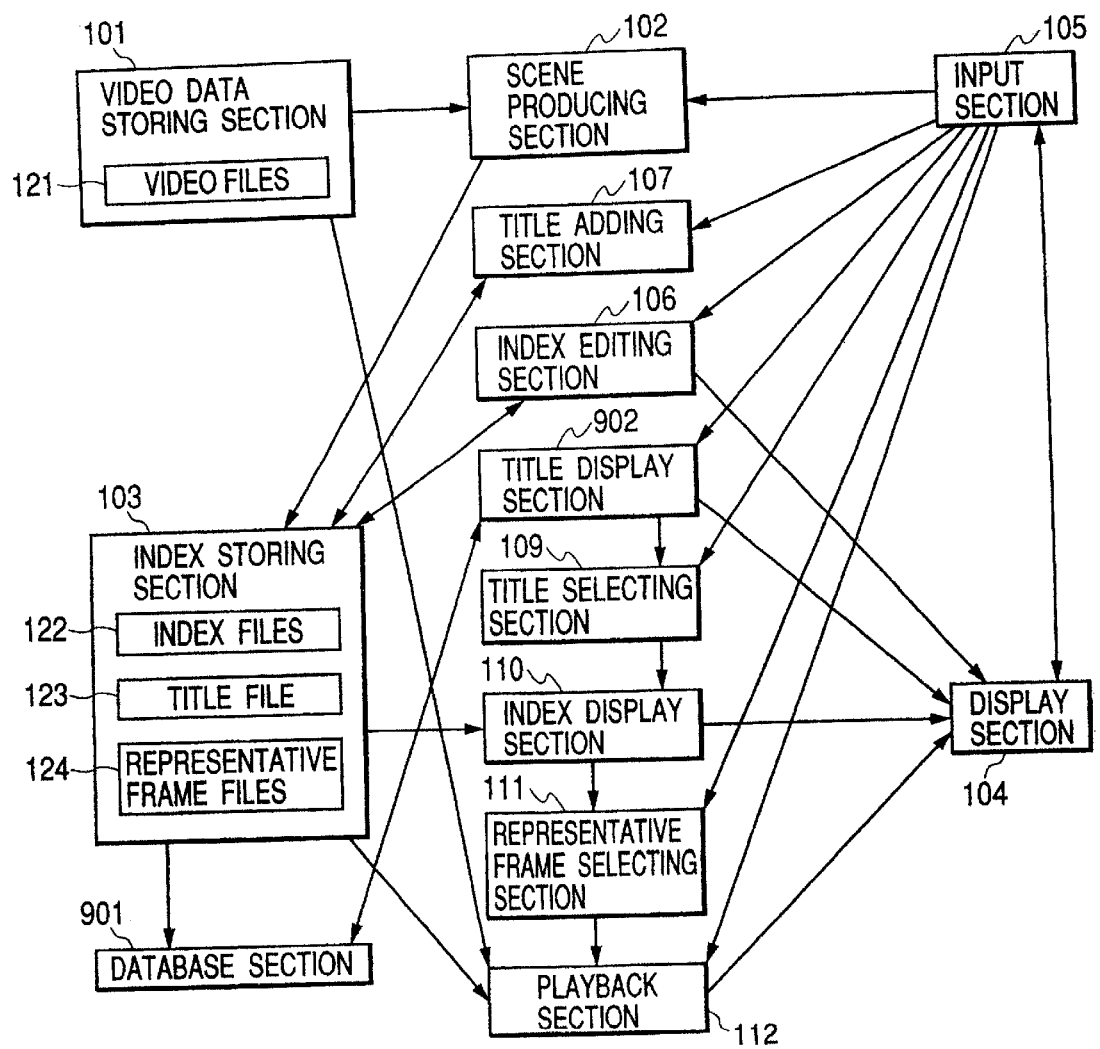
FIG. 9 is a block diagram showing the arrangement of a moving picture administrating apparatus in accordance with a second embodiment of the present invention.

FIG. 9 is a block diagram showing the arrangement of a moving picture administrating apparatus in accordance with a second embodiment of the present invention. The video data storing section 101, the scene producing section 102, the index storing section 103, the display section 104, the input section 105, the index editing section 106, the title adding section 107 are functionally equivalent to those disclosed in the first embodiment. A database section 901 administrates and retrieves the index file names and the titles given to respective indices. A title display section 902 causes the display section 104 to display the title relevant to a character string entered by the user through the input section 105. The title selecting section 109, the index display section 110, the representative frame selecting section 111, and the playback section 112 are functionally equivalent to those disclosed in the first embodiment.

The database section 901 is practically realized by a storing medium, such as a hard disk, and a CPU installed in a personal computer. The title display section 902 is practically realized by the CPU of the personal computer.

Figure 10:
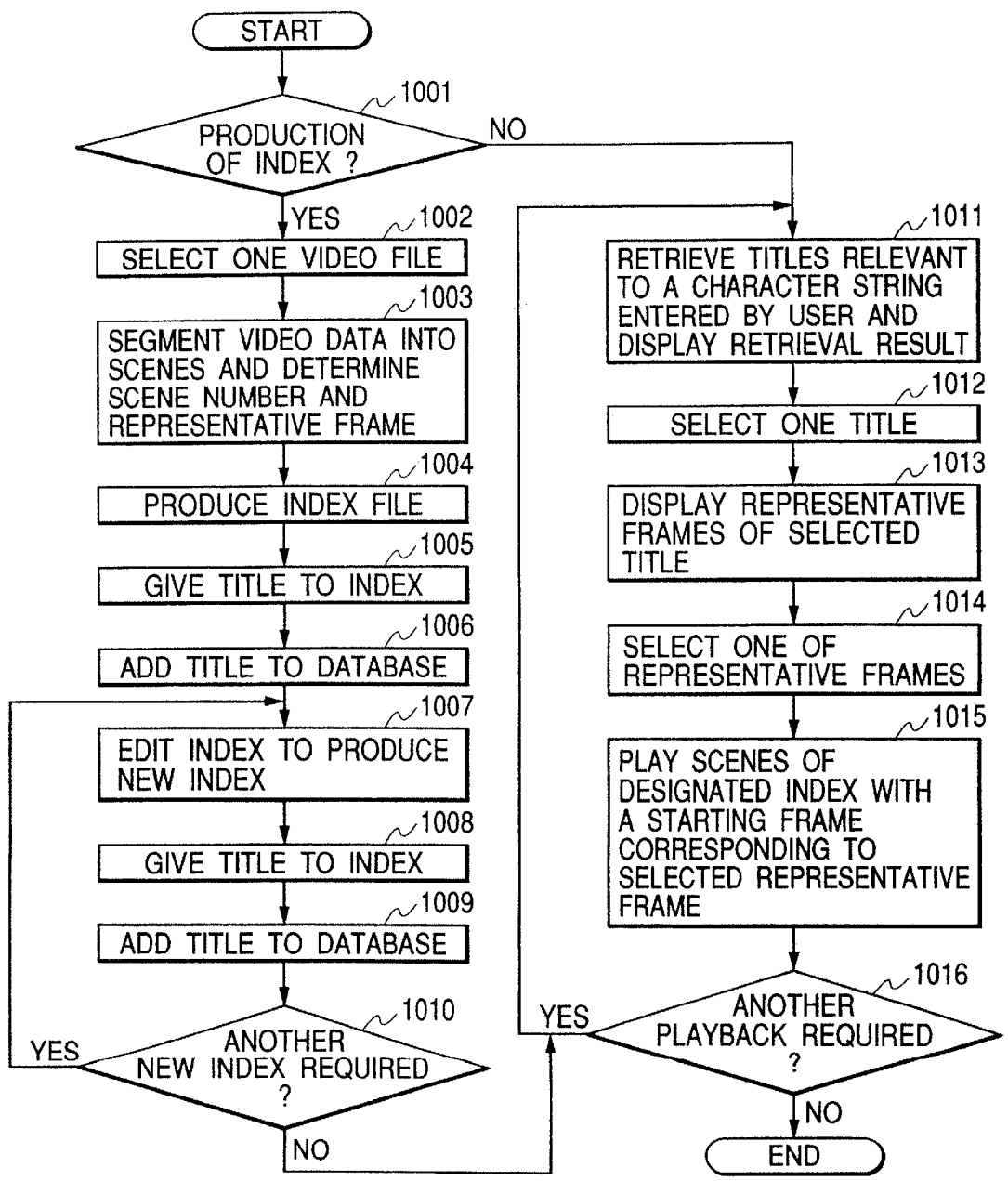
FIG. 10 is a flowchart showing the operation of the moving picture administrating apparatus in accordance with the second embodiment of the present invention.

FIG. 10 is the flowchart showing the operation of the above-described moving picture administrating apparatus in accordance with the second embodiment.

Steps 1001 to 1005, 1007, 1008 and 1010 shown in FIG. 10 are substantially the same as the above-described steps 201 to 208 of the first embodiment.

In step 1001, it is checked whether the user intends to produce an index. The control flow proceeds to step 1002 if the user wants to produce a new index (i.e. YES in step 1001), and proceeds to step 1011 otherwise, i.e., when the user performs the retrieving operation by using the presently available indices.

In step 1002, one of the video files 121 stored in the video data storing section 101 is selected.

In step 1003, the scene producing section 102 segments the video data of the selected video file into a plurality of scenes, and allocates a scene number to each of the segmented scenes. Allocation of the scene numbers is serial in accordance with the arrayed order of scenes so that the first scene number is allocated to the head scene. The head frame of each scene serves as a representative frame of scene.

In step 1004, the scene producing section 102 produces a file summarizing the obtained data, i.e., start/end times of each scene, scene number, file name of a representative frame of scene, and video file name of each scene. The scene producing section 102 sends this file (i.e., index file 122) to the index storing section 103. Thus, the index storing section 103 stores the index file 122 containing the produced index thus produced.

In step 1005, the user operates the input section 105 to enter his/her favorite title to be given to the new index produced in the step 1004. The title adding section 107 reads the title file 123 which records all of the titles produced by the index storing section 103, and adds the newly produced title and its index file name to the head of this title file 123.

In the next step 1006, the database section 901 registers the title and the index file name recorded to the head of the title file 123.

In step 1007, the user operates the input section 105 to select one of index files 122 stored in the index storing section 103. The index editing section 106 reads the selected index file in response to the user's input, and causes the display section 104 to display representative frames in the order of scene number. Then, the index editing section 106 edits the index in accordance with the user's instructions and produces a new index. As described in the first embodiment, the index editing operation performed by the user includes the change of scene number, division of scene, joint of scenes, deletion of scene, and change of the representative fame of scene.

In step 1008, the user operates the input section 105 to enter a name of the index file into which the produced index is stored as well as a title to be given to the produced index. The index storing section 103 stores the file of the index produced in the step 1007. The title adding section 107 reads the title file 123 from the index storing section 103, and adds the title and the index file name entered by the user to the head of the title file 123.

In the next step 1009, the database section 901 registers the title and the index file name recorded to the head of the title file 123.

In step 1010, it is checked whether the user wants to continue the production of new index. When the user requests the production of another new index (i.e., YES in step 1010), the control flow returns to the step 1007. Otherwise, the control flow proceeds to step 1011.

The index required in the retrieving operation is thus produced through the above-described steps 1002 to 1010. The retrieving operation using the produced indices is performed according to the following steps.

In the step 1011, the user operates the input section 105 to enter a character string (i.e., retrieval key) representing the contents which the user wants to search. The title display section 902 retrieves the information stored in the database section 901 to find out candidate titles relevant to the character string entered through the input section 105. Then, the title display section 902 causes the display section 104 to display the obtained retrieval result.

Steps 1012 to 1016 shown in FIG. 10 are substantially the same as the above-described steps 210 to 214 of the first embodiment.

In step 1012, the title selecting section 109 selects one of the candidate titles displayed by the display section 104 in accordance with a user's instruction. In step 1013, the index display section 110 causes the display section 104 to display a list of representative frames of the index corresponding to the title selected in the step 1012. In step 1014, the representative frame selecting section 111 selects one of the representative frames displayed in the step 1013 in accordance with a user's instruction entered through the input section 105.

In step 1015, the playback section 112 successively plays the consecutive scenes of the designated index in order of the scene number, so that the playback starts with the representative frame selected in the step 1014.

In step 1016, it is checked whether the user wants to continue the playback operation (i.e., whether the user wants to play the scenes of other index). When the user requests the playback of any other index (i.e., YES in step 1016), the control flow returns to the step 1011. Otherwise, the retrieving operation is terminated.

According to the above-described operation, the candidate titles relevant to the retrieval key are retrieved and the retrieved candidate titles are displayed by the display section 104 (step 1011). However, it is possible to directly proceed to the step 1013 without displaying the retrieved candidate titles. Then, in this case, it is preferable to display a list of representative frames of the index corresponding to the title which is most relevant to the retrieval key.

Furthermore, it is preferable to provide a keyword adding section which gives keywords to respective indices stored in the index storing section 103. In this case, it is further preferable that the database section 901 registers the keywords thus given so that the retrieving operation can be performed by utilizing the registered keywords in addition to the index titles.

As described above, the second embodiment of the present invention provides the database section 901 to speedily perform the retrieving operation of the index titles and administrate the retrieval data. Thus, the second embodiment makes it possible to easily find out the candidate titles agreeable with the retrieving keys. Furthermore, when the keyword adding section is provided, it becomes possible to find out the candidate titles based on the keywords.

Third Embodiment

Figure 11:
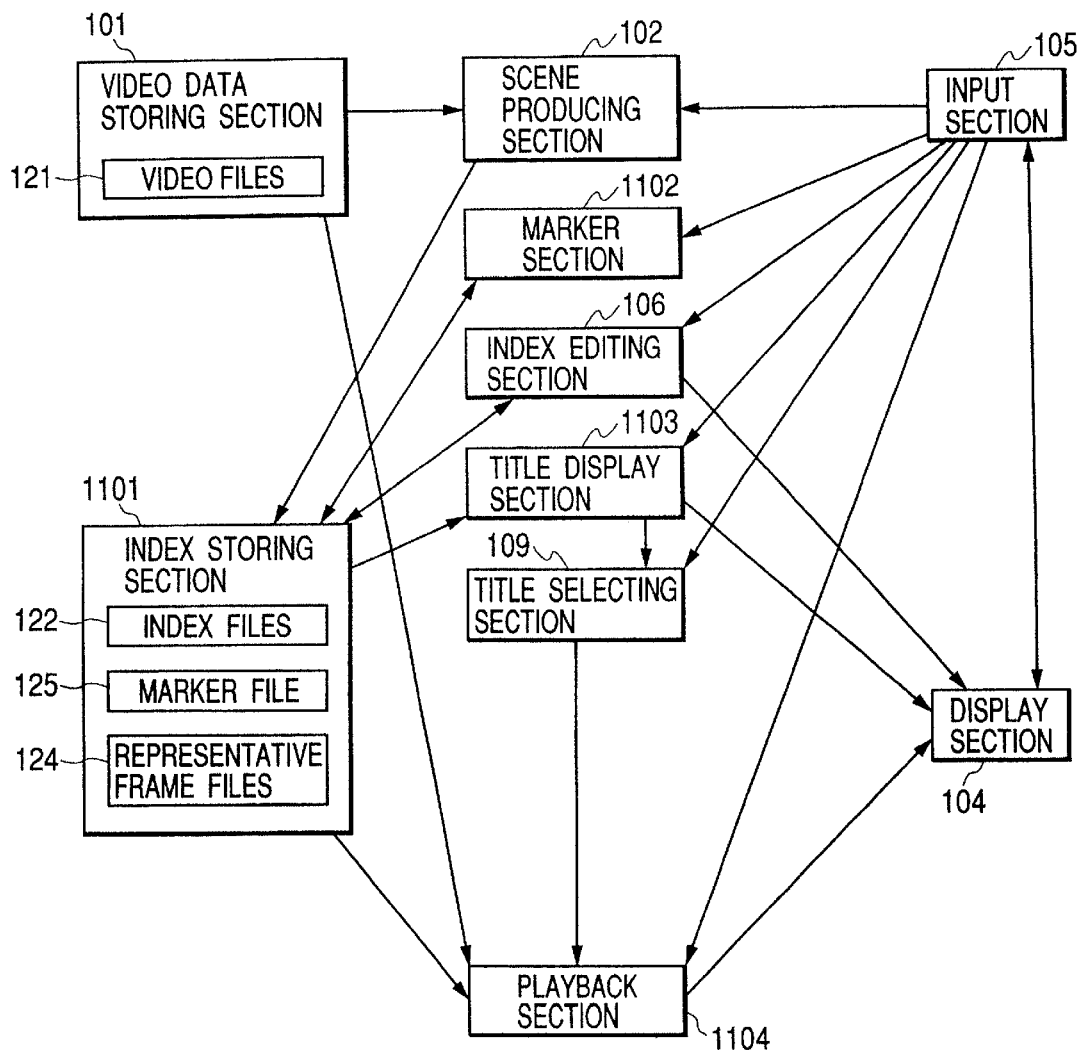
FIG. 11 is a block diagram showing the arrangement of a moving picture administrating apparatus in accordance with a third embodiment of the present invention.

FIG. 11 is a block diagram showing the arrangement of a moving picture administrating apparatus in accordance with a third embodiment of the present invention. The video data storing section 101 and the scene producing section 102 are functionally equivalent to those disclosed in the first embodiment. An index storing section 1101 stores indices each being an assembly of the section information required in the playback operation of each scene obtained in the scene producing section 102 as well as the scene number and the representative frame of each scene. Furthermore, the index storing section 1101 stores titles given to respective scene numbers.

The display section 104, the input section 105, and the index editing section 106 are functionally equivalent to those disclosed in the first embodiment.

A marker section 1102 selects one of the scene numbers of the indices stored in the index storing section 1101 and gives a title to the selected scene number.

A title display section 1103 causes the display section 104 to display the titles stored in the index storing section 1101. The title selecting section 109 is functionally equivalent to that disclosed in the first embodiment. The playback section 1104 plays the scenes of the designated index in the order of scene number. The playback operation starts with the scene having the scene number corresponding to the index which is given the title selected by the title selecting section 1009.

The index storing section 1101 is practically realized by a storing medium, such as a hard disk. The marker section 1102, the title display section 1103, and the playback section 1104 are practically realized by the CPU installed in a personal computer.

Figure 12:
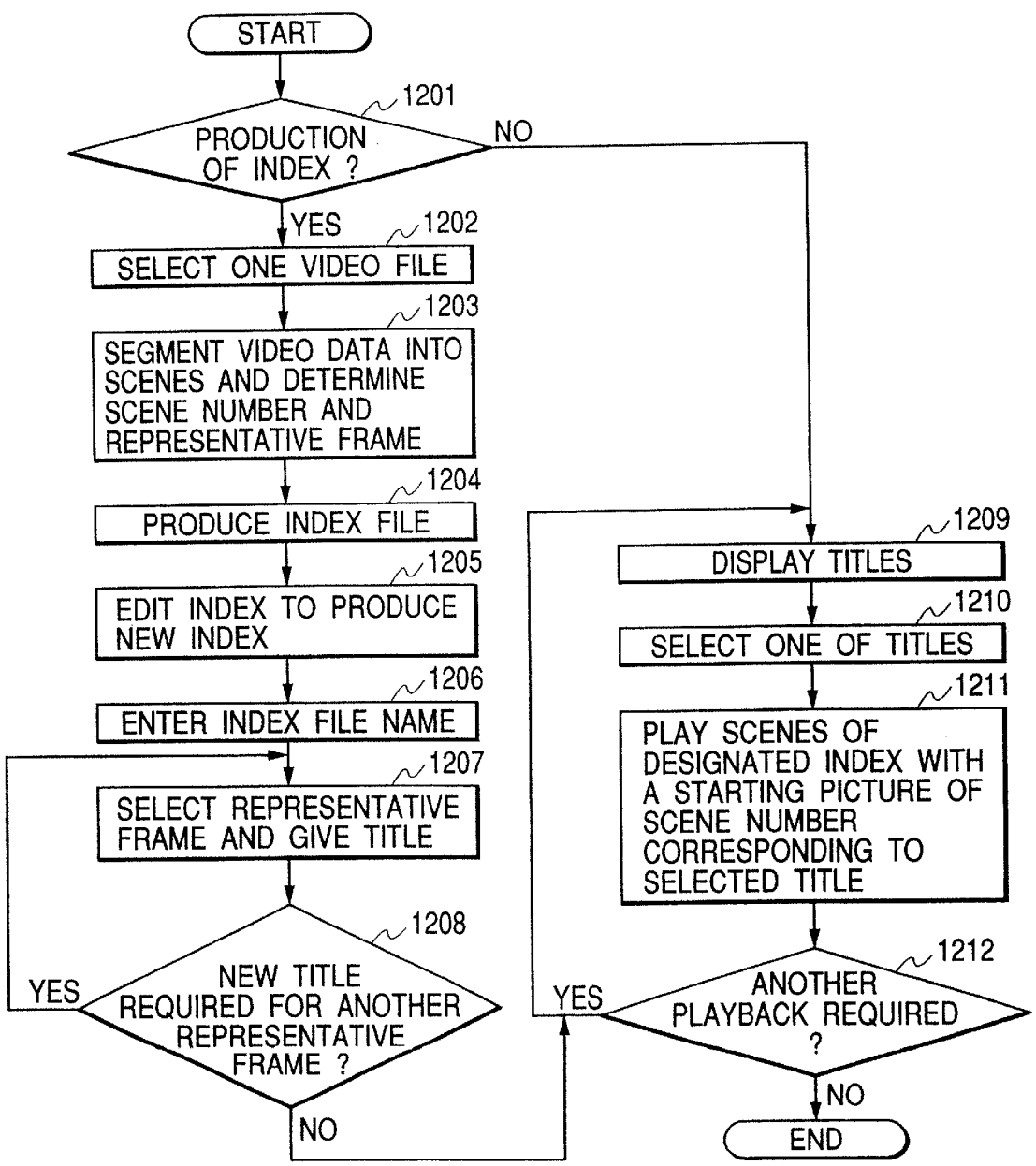
FIG. 12 is a flowchart showing the operation of the moving picture administrating apparatus in accordance with the third embodiment of the present invention.

FIG. 12 is the flowchart showing the operation of the above-described moving picture administrating apparatus in accordance with the third embodiment.

Steps 1201 to 1205, 1210 and 1212 shown in FIG. 12 are substantially the same as the above-described steps 201 to 204, 206, 210 and 214 of the first embodiment.

In step 1201, it is checked whether the user intends to produce an index. The control flow proceeds to step 1202 if the user wants to produce a new index (i.e. YES in step 1201), and proceeds to step 1209 otherwise, i.e., when the user performs the retrieving operation by using the presently available indices.

In step 1202, one of the video files 121 stored in the video data storing section 101 is selected.

In step 1203, the scene producing section 102 segments the video data of the selected video file into a plurality of scenes, and allocates a scene number to each of the segmented scenes. Allocation of the scene numbers is serial in accordance with the arrayed order of scenes so that the first scene number is allocated to the head scene. The head frame of each scene serves as a representative frame of scene.

In step 1204, the scene producing section 102 produces a file summarizing the obtained data, i.e., start/end times of each scene, scene number, file name of a representative frame of scene, and video file name of each scene. The scene producing section 102 sends this file (i.e., index file 122) to the index storing section 1101. Thus, the index storing section 1101 stores the index file 122 containing the produced index thus produced.

In step 1205, the user operates the input section 105 to select one of index files 122 stored in the index storing section 1101. The index editing section 106 reads the selected index file in response to the user's input, and causes the display section 104 to display representative frames in the order of scene number. Then, the index editing section 106 edits the index in accordance with the user's instructions and produces a new index. The user's instructions entered through the input section 105 include the change of scene number, division of scene, joint of scenes, deletion of scene, and change of the representative frame of scene.

In step 1206, the user operates the input section 105 to enter a file name of the index file 122 into which the new index produced in the step 1205 is stored. Thus, the index storing section 1101 stores the index file containing the newly produced index.

In step 1207, the user operates the input section 105 to select one of the representative frames and enter a title to be given to the selected representative frame. The marker section 1102 stores the name of index file 122, the scene number of the representative frame selected by the user, and the title entered by the user into a marker file 125. More specifically, the index storing section 1101 comprises an already produced marker file 125. Thus, the marker section 1102 reads the marker file 125 from the index storing section 1101, and adds the name of index file 122, the scene number of the representative frame selected by the user, and the title entered by the user to the head of the marker file 125.

The total number of the marker files 125 provided in the index storing section 1101 is not limited to one. Accordingly, it is possible to provide a plurality of marker files 125. For example, the index files 122 stored in the index storing section 1101 can be classified into a plurality of genres, such as news programs, TV dramas, self-produced videotape recording data, etc. In such a case, it is preferable to provide an independent marker file to each genre. It is also preferable to produce a new marker file when the total number of the recorded titles exceeds a predetermined number (e.g. 100).

The title can be given freely. For example, it is possible to collect only necessary scenes from the video data of TV programs or from the self-recorded videotape recording data, and is possible to produce an index beforehand based on the collected scenes. For example, for the purpose of utilizing the collected scenes as teaching materials, it is possible to give a title to each scene from which the playback operation starts or resumes. In this case, the given title may be "Historical Background of ∘∘'s Law ", "Experiment of ∘∘", or "Instruments Utilizing the ∘∘'s Law."

When the user and his/her family have their memories recorded by a video camera during a travel, it is possible to integrate their memories into same video data with a plurality of titles. For example, each title may correspond to a recording place. In this case, appropriate titles representing different recording places, such as "At ∘∘∘∘ Coast" or "At xxxx Hotel", can be used. In this manner, when the video data can be classified into a plurality of groups, it is possible to give a plurality of titles according to their contents.

In step 1208, it is judged whether the user wants to give a new title to another representative frame, i.e., whether the user wants to continue the allocation of titles. When the user requests another new title (i.e., YES in step 1208), the control flow returns to the step 1207. Otherwise, the control flow proceeds to step 1209.

The index required in the retrieving operation and the marker file 125 are thus produced through the above-described steps 1202 to 1208. The retrieving operation using the produced indices and the marker file 125 is performed according to the following steps.

In step 1209, the title display section 1103 reads the marker file 125 from the index storing section 1101, and causes the display section 104 to display the readout titles. It is possible to display a limited number of titles which are selected by the user. In step 1210, the title selecting section 109 selects one of the titles displayed by the display section 104 in accordance with a user's instruction entered through the input section 105.

In step 1211, the playback section 1104 successively plays the consecutive scenes of the designated index in order of the scene number, so that the playback starts with the scene number of the index corresponding to the title selected in the step 1210. In step 1212, it is checked whether the user wants to continue the playback operation (i.e., whether the user wants to play other scenes). When the user requests the playback of other scenes (i.e., YES in step 1212), the control flow returns to the step 1209. Otherwise, the retrieving operation is terminated.

The above-described operation performs the index editing operation only one time (refer to the steps 1205 to 1206). However, it is possible to perform the index editing operation two times or more so that three or more indices can be produced. Alternatively, it is possible to omit the index editing operation. In this case, the index storing section 1101 stores only the indices produced in the steps 1203 and 1204.

The above-described third embodiment makes it possible to flexibly give appropriate titles to the retrieved scenes with reference to the retrieval purposes. Thus, it becomes possible to reuse the old search result collected according to the retrieval purposes arbitrarily selected by the user.

Furthermore, the above-described third embodiment makes it possible to perform the playback operation by connecting only the necessary scenes of video data by editing the indices arraying the necessary scenes. Furthermore, by giving the title to each head scene from which the user wants to start the playback, the use can search his/her favorite head scene according to the title.

Fourth Embodiment

Figure 13:
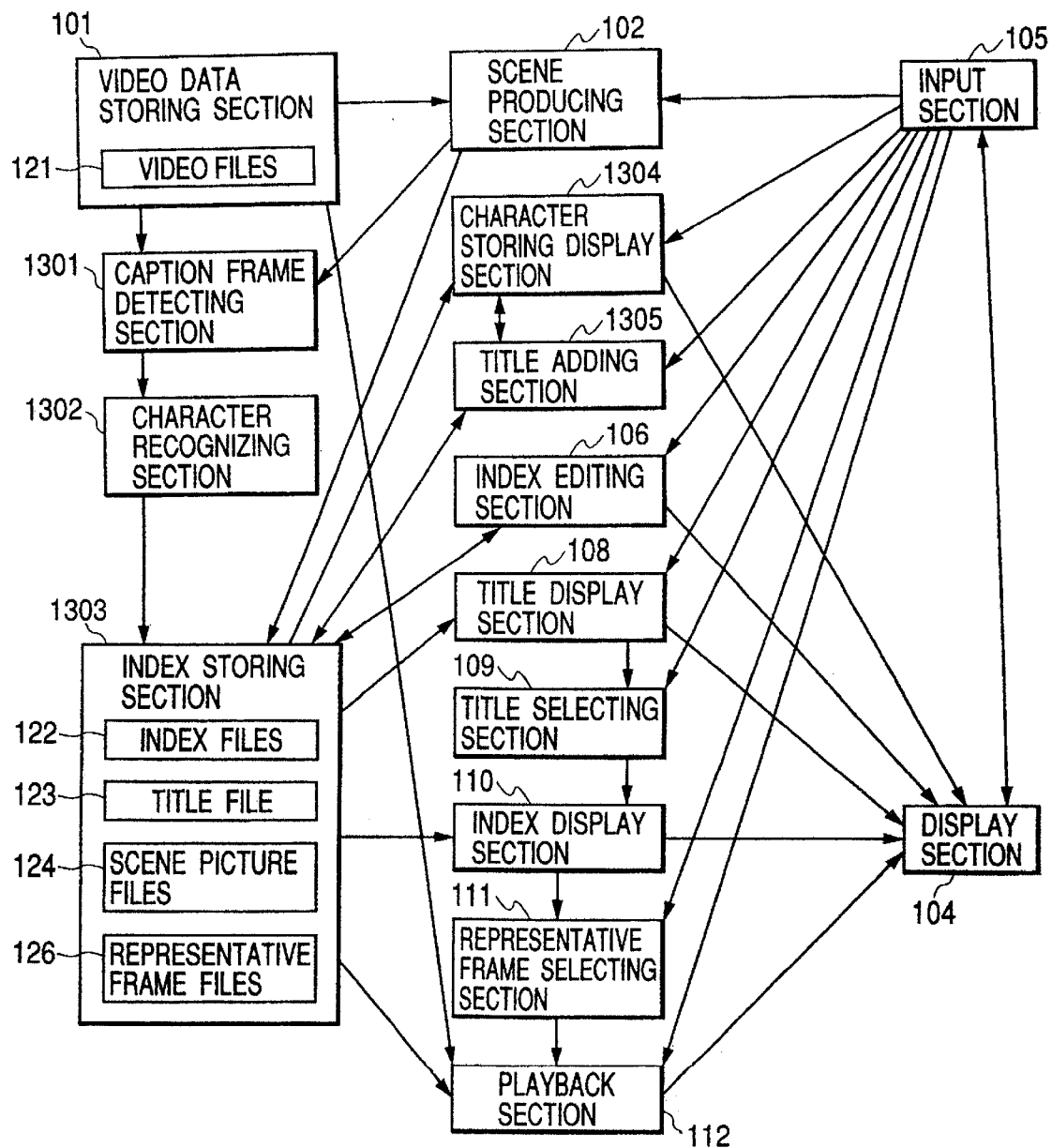
FIG. 13 is a block diagram showing the arrangement of a moving picture administrating apparatus in accordance with a fourth embodiment of the present invention.

FIG. 13 is a block diagram showing the arrangement of a moving picture administrating apparatus in accordance with a fourth embodiment of the present invention. The video data storing section 101, the scene producing section 102, the display section 104, the input section 105, and the index editing section 106 are functionally equivalent to those disclosed in the first embodiment. A caption frame detecting section 1301 retrieves the video data stored in the video data storing section 101 to detect a frame displaying a character string superimposed thereon. The detected frame is designated as a caption frame.

A character recognizing section 1302 recognizes the character string in the caption fame, and produces the recognized result. An index storing section 1303 stores indices each being an assembly of the section information required in the playback operation of each scene obtained in the scene producing section 102 as well as the scene number and the representative frame of each scene. Furthermore, the index storing section 1303 stores titles given to respective indices and character strings (i.e., caption characters) obtained by the character recognizing section 1302.

A character string display section 1304 displays a list of caption characters stored in the index storing section 1303.

A title adding section 1305 has a function of obtaining the caption characters displayed by the character string display section 1304 and also has a function of giving a title to each index. The title display section 108, the title selecting section 109, the index display section 110, the representative frame selecting section 111 and the playback section 112 are functionally equivalent to those disclosed in the first embodiment.

The caption frame detecting section 1301, the character recognizing section 1302, the character string display section 1304, and the title adding section 1305 are practically realized by the CPU installed in a personal computer. The index storing section 1303 is practically realized by a storing medium, such as a hard disk.

Figure 14:
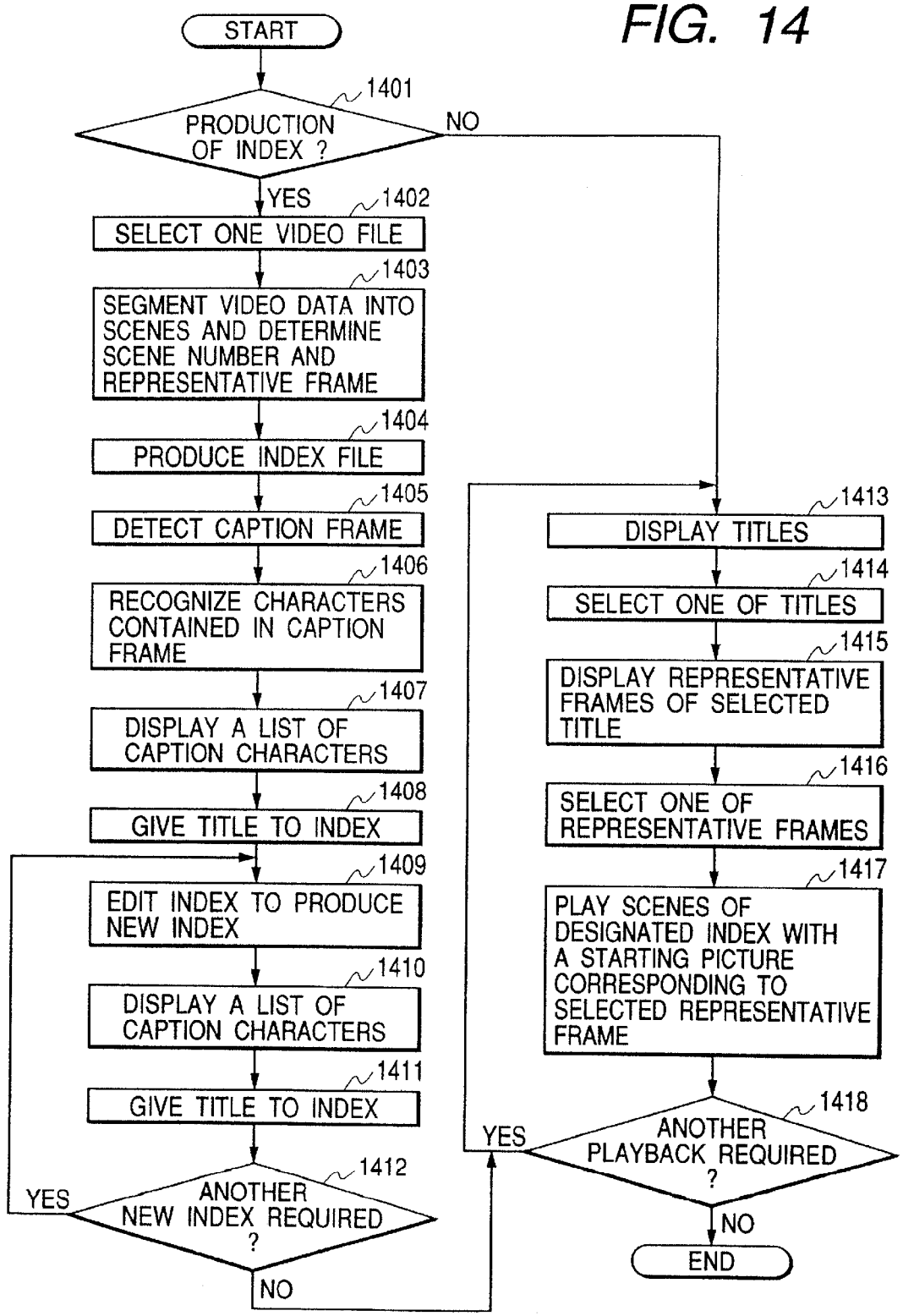
FIG. 14 is a flowchart showing the operation of the moving picture administrating apparatus in accordance with the fourth embodiment of the present invention.
Figure 15:
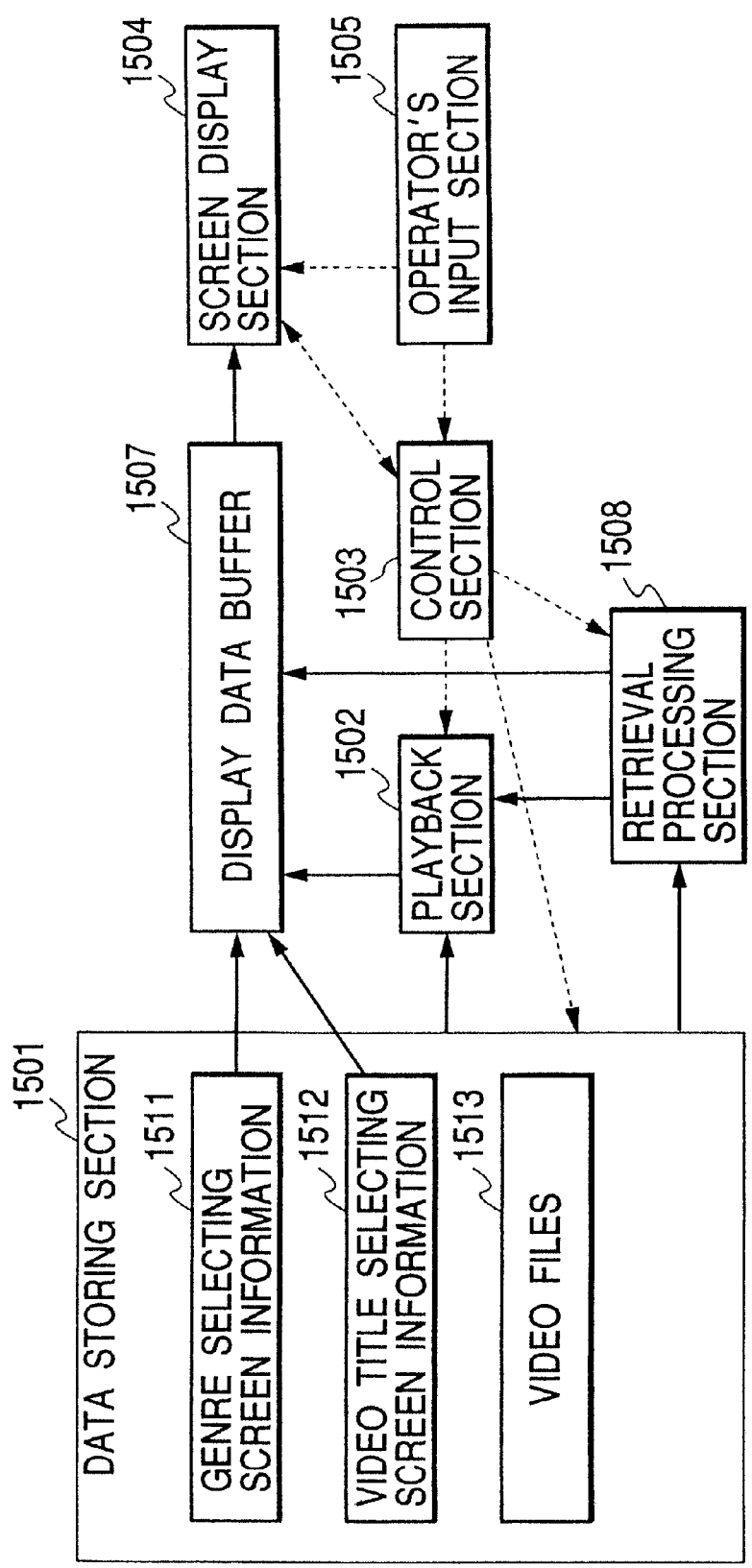
FIG. 15 is a block diagram showing the arrangement of a conventional moving picture retrieving apparatus.
Figure 16:
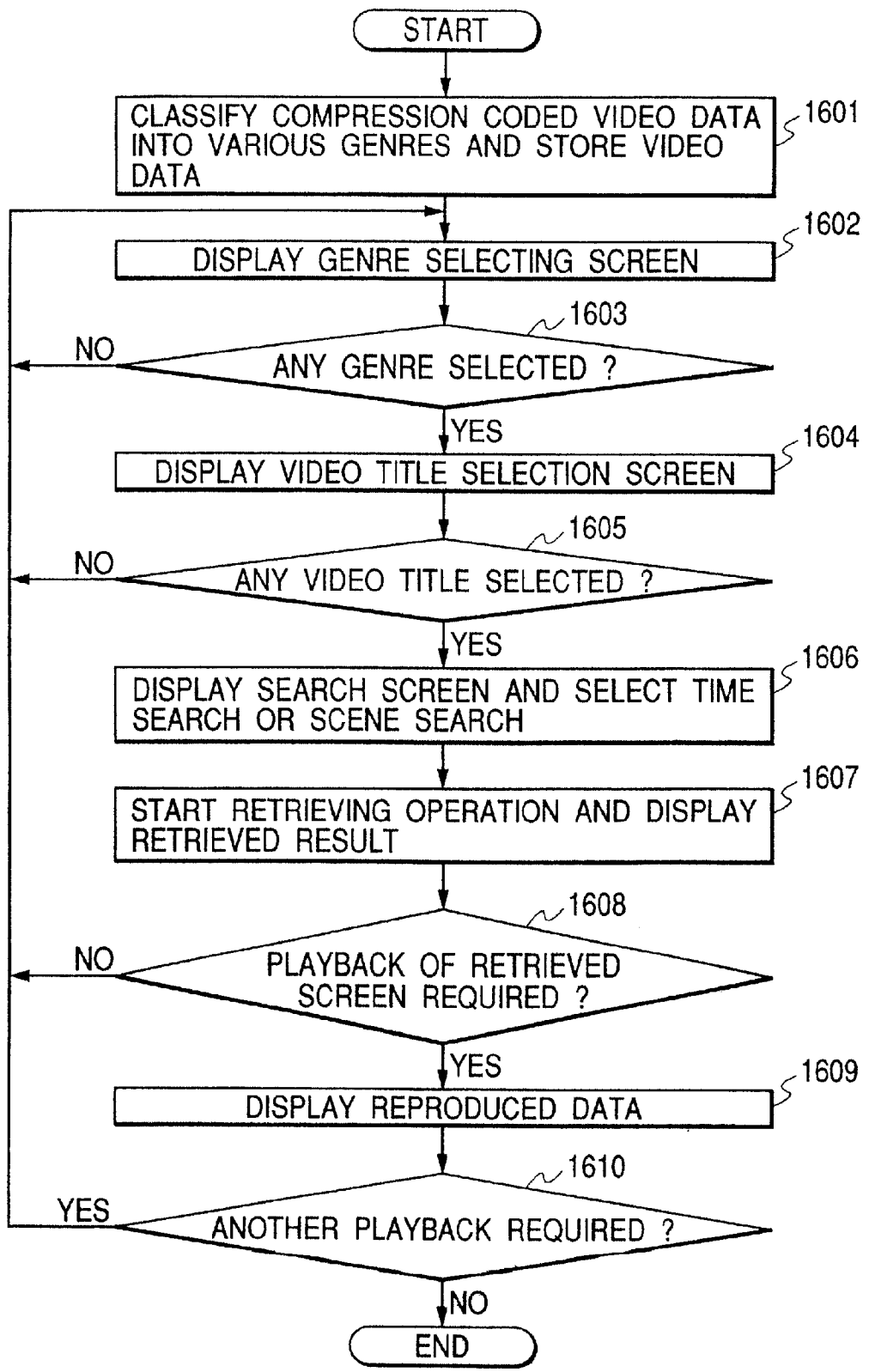
FIG. 16 is a flowchart showing the operation of the conventional moving picture retrieving apparatus.
Figure 17:
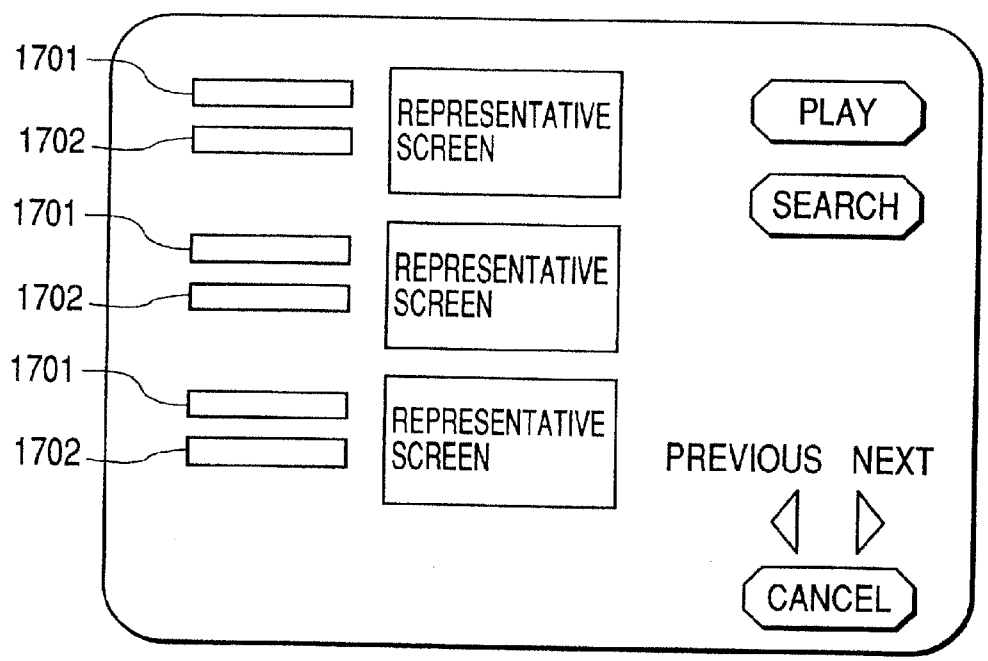
FIG. 17 is a schematic view showing a video title retrieving screen in accordance with the conventional moving picture retrieving apparatus.
Figure 18:
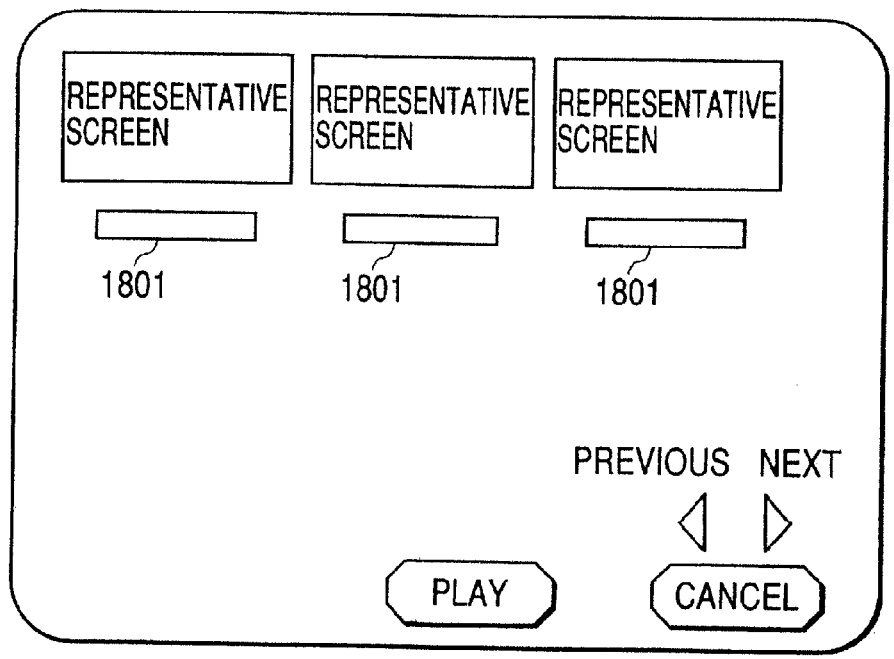
FIG. 18 is a schematic view showing a retrieval result in accordance with the conventional moving picture retrieving apparatus.

FIG. 14 is the flowchart showing the operation of the above-described moving picture administrating apparatus in accordance with the fourth embodiment.

Steps 1401 to 1404, 1409, and 1412 shown in FIG. 14 are substantially the same as the above-described steps 201 to 204, 206, and 208 of the first embodiment.

In step 1401, it is checked whether the user intends to produce an index. The control flow proceeds to step 1402 if the user wants to produce a new index (i.e. YES in step 1401), and proceeds to step 1413 otherwise, i.e., when the user performs the retrieving operation by using the presently available indices.

In step 1402, one of the video files 121 stored in the video data storing section 101 is selected.

In step 1403, the scene producing section 102 segments the video data of the selected video file into a plurality of scenes, and allocates a scene number to each of the segmented scenes. Allocation of the scene numbers is serial in accordance with the arrayed order of scenes so that the first scene number is allocated to the head scene. The head frame of each scene serves as a representative frame of scene.

In step 1404, the scene producing section 102 produces a file summarizing the obtained data, i.e., start/end times of each scene, scene number, file name of a representative frame of scene, and video file name of each scene. The scene producing section 102 sends this file (i.e., index file 122) to the index storing section 1303. Thus, the index storing section 1303 stores the index file 122 containing the produced index thus produced.

In step 1405, the caption frame detecting section 1301 detects a frame displaying a character string and identifies the detected frame as one of caption frames. The unexamined Japanese Patent publication No. 10-154148 discloses a method for automatically detecting a character string from video data.

In step 1406, the character recognizing section 1302 recognizes the character string in the caption frame, and produces the recognized result (i.e., caption characters). The index storing section 1303 stores a single file containing the caption characters resultant from the same video data. This file is referred to as caption file 126. Regarding the method for recognizing the characters, its detailed technique will be found, for example, in the "Character Recognition and Translation for Texts in a Scene" written by Watanabe et al., The Journal of the Institute of Image Electronics Engineers of Japan, vol. 26, No. 6, 1997.

In step 1407, the character string display section 1304 reads the caption file 126 stored in the step 1406 and causes the display section 104 to display the list of the readout caption characters. In step 1408, the user operates the input section 105 to select one of the caption characters displayed by the display section 104, and then produces a title by using an editor. The title adding section 1305 accesses the index storing section 1303 to read the title file 123 recording the titles of already produced indices. Then, the title adding section 1305 adds the new title edited by the editor and its index file name to the head of the title file 123.

In step 1409, the user operates the input section 105 to select one of index files 122 stored in the index storing section 1303. The index editing section 106 reads the selected index file in response to the user's input, and causes the display section 104 to display representative frames in the order of scene number. Then, the index editing section 106 edits the index in accordance with the user's instructions and produces a new index. The user's instructions entered through the input section 105 include the change of scene number, division of scene, joint of scenes, deletion of scene, and change of the representative frame.

In step 1410, the character string display section 1304 reads the caption file 126 stored in the step 1406 and causes the display section 104 to display the list of the readout caption characters. In step 1411, the user operates the input section 105 to select one of the caption characters displayed by the display section 104, and then produces a title by using an editor. The title adding section 1305 accesses the index storing section 1303 to read the title file 123 and add the new title edited by the editor and its index file name to the head of the title file 123.

In step 1412, it is checked whether the user wants to continue the production of new index. When the user requests the production of another new index (i.e., YES in step 1412), the control flow returns to the step 1409. Otherwise, the control flow proceeds to step 1413.

The index required in the retrieving operation is thus produced through the above-described steps 1402 to 1412. The retrieving operation using the produced indices is performed according to the following steps.

Steps 1413 to 1418 shown in FIG. 14 are substantially the same as the above-described steps 209 to 214 of the first embodiment.

In step 1413, the title display section 108 reads the title file 123 from the index storing section 1303, and causes the display section 104 to display the readout index titles.

In step 1414, the title selecting section 109 selects one of the titles displayed by the display section 104 in accordance with a user's instruction.

In step 1415, the index display section 110 causes the display section 104 to display a list of representative frames of the index corresponding to the title selected in the step 1414. In step 1416, the representative frame selecting section 111 selects one of the representative frames displayed in the step 1415 in accordance with a user's instruction entered through the input section 105.

In step 1417, the playback section 112 successively plays the consecutive scenes of the designated index in order of the scene number, so that the playback starts with the representative frame selected in the step 1416.

In step 1418, it is checked whether the user wants to continue the playback operation (i.e., whether the user wants to play the scenes of other index). When the user requests the playback of any other index (i.e., YES in step 1418), the control flow returns to the step 1413. Otherwise, the retrieving operation is terminated.

According to the above operation, the index file 122 is produced first in the steps 1403 to 1404 and the caption file 126 is produced in the later steps 1405 to 1406. However, it is possible to produce the caption file 126 prior to the production of the index file 122. Alternatively, it is also preferable to produce the caption file 126 and the index file 122 simultaneously by using the parallel processing.

Furthermore, when the caption character data is attached to a video file or available through Internet, such data can be used to produce the caption file 126 of the present invention instead of utilizing the method for automatically detecting a character string from video data or utilizing the method of recognizing the characters. Namely, in such a case, the steps 1405 to 1406 can be omitted.

Moreover, it is possible to utilize the caption characters recorded in the caption file 126 as the index keywords of respective indices.

As described above, the fourth embodiment does not require time and labor to play a video data to know contents of a vide data. The title can be easily added to each index by correcting a character string.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A moving picture administrating apparatus, comprising:
    a video data storing means for storing video data;
    a scene producing means for segmenting said video data stored in said video data storing means into a plurality of segmented scenes, giving a scene number to each of said segmented scenes, and selecting a representative frame of scene;
    an index storing means for storing at least one index being edited as an assembly of section information required in a playback of each scene, said scene number, and said representative frame of scene which are produced by said scene producing means;
    an index editing means for editing said index stored in said index storing means to produce a new index;
    a title adding means for adding a title to each index stored in said index storing means;
    a playback means for successively playing scenes in order of the scene number so that the playback starts with one of scenes of said index;
    a caption frame detecting means for retrieving said video data stored in said video data storing means to detect a caption frame containing a character string;
    a character recognizing means for recognizing a character string contained in each caption frame, and
    a character string display means for displaying a list of caption character strings recognized by said character recognizing means.

2. The moving picture administrating apparatus in accordance with claim 1, wherein:
    an index producing client acts as said scene producing means, said index editing means, and said title adding means;
    a server act s as said video data storing means and said index storing means;
    at least one retrieving client acts as said playback means; and
    said server, said index producing client, and said at least one retrieving client are connected via a network.

3. The moving picture administrating apparatus in accordance with claim 1, further comprising:
    a retrieving means for performing an index search by designating retrieval conditions relevant to a search purpose; and
    wherein said playback means operates for successively playing scenes in order of the scene number so that the playback starts with one of scenes of a retrieved index corresponding to said retrieval conditions.

4. The moving picture administrating apparatus in accordance with claim 1, wherein said index storing means comprises at least one file for storing indices, and further including a database means for administrating and retrieving file names of said indices and the titles assigned to respective indices.

5. The moving picture administrating apparatus in accordance with claim 1, further comprising a keyword assigning means for giving keywords to respective indices stored in said index storing means.

6. The moving picture administrating apparatus in accordance with claim 5, wherein said index storing means comprises at least one file for storing the indices, and further including a database means for administrating and retrieving file names of said indices and the keywords assigned to the indices.

7. The moving picture administrating apparatus in accordance with claim 3, further comprising a title display means for displaying the titles of said indices stored in said index storing means.

8. The moving picture administrating apparatus in accordance with claim 7, wherein the titles displayed by said title display means satisfy said retrieval conditions.

9. The moving picture administrating apparatus in accordance with claim 1, wherein the editing performed by said index editing means includes at least one operation selected from the group consisting of change of scene number, division of scene, joining of scenes, deletion of scene, and change of the representative frame of scene.

10. The moving picture administrating apparatus in accordance with claim 1, further comprising a title selecting means for selecting one of titles given by said title adding means, and an index display means for displaying representative frames which are selected beforehand as corresponding to an index having the title selected by said title selecting means.

11. The moving picture administrating apparatus in accordance with claim 1, further comprises a character string display means for collecting character strings to be displayed on a screen by retrieving said video data stored in said video data storing means and for displaying a list of obtained character strings.

12. The moving picture administrating apparatus in accordance with claim 1, wherein said index storing means stores arecognition result produced by sai chacter recognizing means.

13. The moving picture administrating apparatus in accordance with claim 1, further comprising keyword adding means for giving keywords to the indices stored in said index storing means based on a recognition result produced by said character recognizing means.

14. The moving picture administrating apparatus in accordance with claim 1, further comprising an editor for editing a title based on a recognition result produced by said character recognizing means.

15. A moving picture administrating apparatus, comprising:

a video data storing means for storing video data;

a scene producing means for segmenting said video data stored in said video data storing means into a plurality of segmented scenes, giving a scene number to each of said segmented scenes, and selecting a representative frame of scene;

an index storing means for storing at least one index being edited as an assembly of section information required in a playback of each scene, said scene number, and said representative frame of scene which are produced by said scene producing means;

an index editing means for editing said index stored in said index storing means to produce a new index;

a title adding means for adding a title to each index stored in said index storing means;

a playback means for successively playing scenes in order of the scene number so that the playback starts with one of scenes of said index;

a caption frame detecting means for retrieving said video data stored in said video data storing means to detect a caption frame containing a character string;

a character recognizing means for recognizing a character string contained in each caption frame, a character string display means for displaying a list of caption character strings recognized by said character recognizing means; and means enabling a user to edit a listed caption character string by using an editor, thereby enabling the user to provide a title to the index by modifying an arbitrary caption character string selected from said list of caption character strings.

* * * * *